(12) United States Patent
Zetek et al.

(10) Patent No.: US 10,799,960 B2
(45) Date of Patent: Oct. 13, 2020

(54) MILLING CUTTER WITH BRACES

(71) Applicant: Západočeská univerzita v Plzni, Plzen (CZ)

(72) Inventors: Miroslav Zetek, Plzen (CZ); Vaclav Schornik, Milevsko (CZ)

(73) Assignee: Západočeská univerzita v Plzni, Plzen (CZ)

( * ) Notice: Subject to any disclaimer, the term of this patent is extended or adjusted under 35 U.S.C. 154(b) by 0 days.

(21) Appl. No.: 16/087,007

(22) PCT Filed: Apr. 13, 2017

(86) PCT No.: PCT/CZ2017/000026
§ 371 (c)(1),
(2) Date: Sep. 20, 2018

(87) PCT Pub. No.: WO2017/177990
PCT Pub. Date: Oct. 19, 2017

(65) Prior Publication Data
US 2019/0099816 A1    Apr. 4, 2019

(30) Foreign Application Priority Data

Apr. 14, 2016 (CZ) ..................... 2016-215

(51) Int. Cl.
| B23C 5/00 | (2006.01) |
| B23C 5/22 | (2006.01) |
| B23C 5/20 | (2006.01) |
| B23C 5/06 | (2006.01) |

(52) U.S. Cl.
CPC ............... *B23C 5/006* (2013.01); *B23C 5/06* (2013.01); *B23C 5/20* (2013.01); *B23C 5/22* (2013.01)

(58) Field of Classification Search
CPC .. B23C 5/006; B23C 5/06; B23C 5/20; B23C 5/22

See application file for complete search history.

(56) References Cited

U.S. PATENT DOCUMENTS

| 2,600,280 A | * | 6/1952 | Staples ..................... B23C 5/02 408/156 |
| 5,567,092 A | * | 10/1996 | Post ....................... B23C 5/006 407/36 |
| 5,605,420 A | * | 2/1997 | Feldsine ................ B23C 5/006 407/32 |
| 6,120,218 A | * | 9/2000 | Bishop .................. B23C 5/006 407/34 |

(Continued)

FOREIGN PATENT DOCUMENTS

| CZ | 8905715 A3 | 5/1994 | |
| DE | 19725100 A1 | * 12/1998 | ............... B23C 5/28 |

OTHER PUBLICATIONS

DE 197 25 100 Machine translation, pp. 3-4 (Year: 2020).*

(Continued)

*Primary Examiner* — Nicole N Ramos
(74) *Attorney, Agent, or Firm* — Hovey Williams LLP

(57) ABSTRACT

The milling cutter according to the present invention consists of insert holders (2) where these insert holders (2) project from a carrier disc (1) which is adapted for clamping onto the spindle of a machine tool, and the individual holders (2) are connected with one another by braces (3). Arms (5) are provided between the holders (2) and the carrier disc (1).

2 Claims, 1 Drawing Sheet

(56) References Cited

U.S. PATENT DOCUMENTS

| 6,595,727 B2* | 7/2003 | Arvidsson | B23C 5/006 |
| | | | 407/35 |
| 2002/0168235 A1 | 11/2002 | Johnson | |
| 2005/0019110 A1 | 1/2005 | Astrakhan | |
| 2005/0164620 A1* | 7/2005 | Amamoto | B23C 5/006 |
| | | | 451/548 |
| 2005/0166727 A1* | 8/2005 | Peltonen | B23B 29/03403 |
| | | | 82/1.11 |
| 2011/0182677 A1* | 7/2011 | Frank | B23B 29/0341 |
| | | | 407/46 |
| 2014/0161543 A1* | 6/2014 | Francis | B23C 5/006 |
| | | | 407/11 |

OTHER PUBLICATIONS

International Search Report from Corresponding International Application PCT/CZ2017/000026, dated Jul. 3, 2017 (4 pages).
Written Opinion of the International Searching Authority from Corresponding International Application No. PCT/CZ2017/000026 dated Jul. 3, 2017 (3 pages).

* cited by examiner

MILLING CUTTER WITH BRACES

RELATED APPLICATIONS

This application is the National Stage of International Patent Application No. PCT/CZ2017/000026, filed Apr. 13, 2017, which is hereby incorporated herein by reference in its entirety, and which claims priority to Czech Patent Application No. PV 2016-215, filed Apr. 14, 2016, which is also incorporated herein by reference in its entirety.

TECHNICAL FIELD

The present invention concerns a milling cutter which consists of insert holders that project from a carrier disc which is adapted for clamping onto the spindle of a machine tool.

BACKGROUND ART

Milling cutters known to this date comprise insert holders arranged along the circumference of the tool body. These insert holders are separated by flutes whose primary role is to facilitate chip removal and their secondary role is to supply cutting fluid to the face of the insert. This design can be seen, for instance, in the milling cutter described in document no. CZ 278929. Milling cutters of such design are usually made of steel. Their weight tends to be substantial, which helps stabilize their rotation speed during operation by damping the shocks from inserts' engagement, but also extends the time needed to bring the spindle to its operating speed and to a halt. In addition, this design frequently causes tool imbalance, and therefore constrains the maximum number of revolutions per minute which can be achieved without the risk of damage to the spindle. Machine-tools that use these tools must be sufficiently robust, particularly for roughing operations where greater cutting forces can be expected. Where the weight of the milling cutter body needs to be reduced, the usual solution is to remove excess material based on identified actual stress distribution. Such a procedure may also compromise the accuracy of the weight distribution within the tool, resulting in balance problems at higher speeds. In order to reduce the weight of milling cutters, their bodies are sometimes made of light alloys and fitted with exchangeable inserts installed in steel pockets which are firmly attached to the body. Milling cutters of light alloys intended for cutting higher-strength materials are not suitable for roughing operations. Titanium is sometimes employed in milling cutter construction. However, as this metal is difficult to machine, tools with titanium bodies are costly.

DISCLOSURE OF INVENTION

These drawbacks are eliminated by a milling cutter which comprises insert holders that project from a carrier disc which is adapted for clamping onto the spindle of a machine tool. The insert holders are connected with one another by braces. Such a design of the carrier disc delivers maximum reduction in its weight while maintaining sufficient stiffness thanks to an appropriate configuration of the braces.

The circumference determined by the inserts can be increased by providing arms between the holders and the carrier disc.

The stiffness of the entire structure can be improved by providing struts between individual arms and braces.

The stiffness can be improved further by providing struts between the arms and the holders.

An additional increase in stiffness is achieved when the holders are arranged around a collar which does not project beyond the envelope of the inserts in either radial or face direction, and the holders are attached to the collar with stiffeners. A spatial lattice of bars constructed in this manner delivers maximum stiffness at minimum weight.

DESCRIPTION OF DRAWINGS

A general view of the milling cutter from the carrier disc side using axonometric projection is shown in FIG. 1, with the inserts omitted; a front view from the side of the holders of exchangeable inserts is in FIG. 2; another view from the side of the carrier disc is shown in FIG. 3 and a view from the side of the holders of inserts using axonometric projection is in FIG. 4.

DESCRIPTION OF EXAMPLE EMBODIMENT

Figure 2:
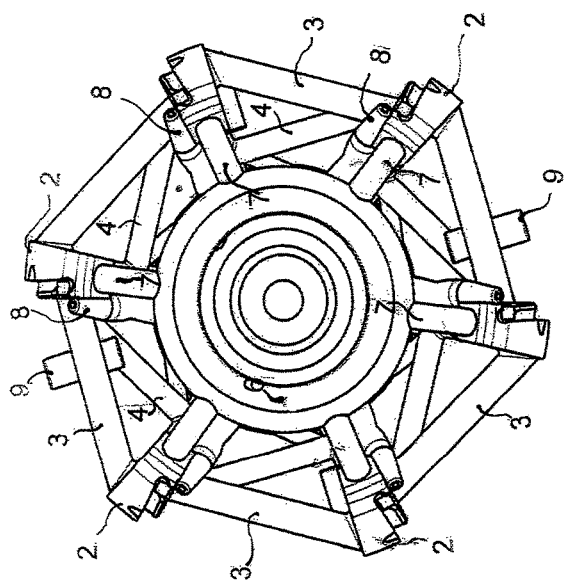
Figure 4:
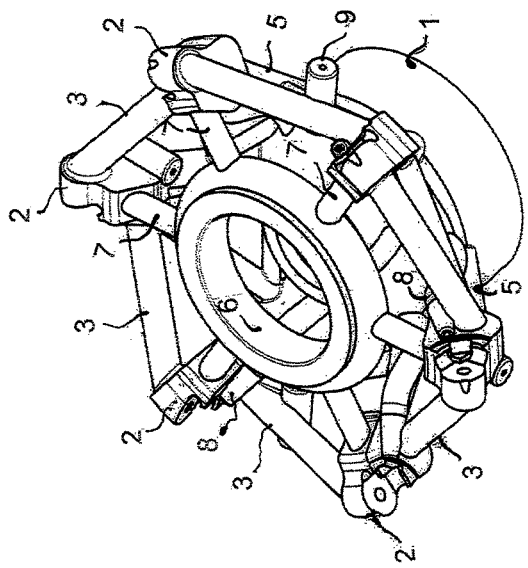
Figure 1:
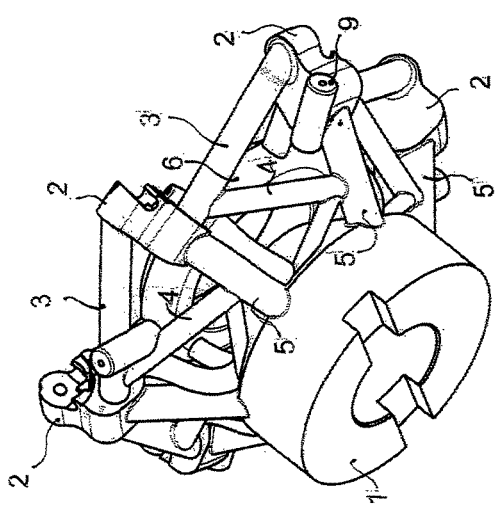
Figure 3:
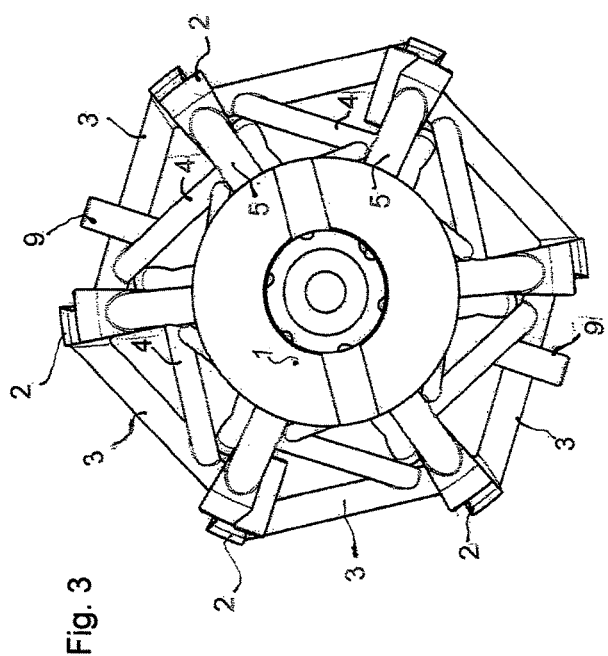

The milling cutter consists of insert holders 2 where the holders 2 project from carrier disc 1 which is adapted for clamping onto the spindle of a machine tool. The holders 2 are connected with one another by braces 3. Arms 5 are provided between the holders 2 and carrier disc 1. Struts 4 are provided between the arms 5 and braces 3. Holders 2 are arranged around and connected by stiffeners 7 to the collar 6, which does not project beyond the envelope of the inserts. The inserts are not shown on the drawing; their attachment to the holders 2 is outside the scope of this invention. Leading from the carrier disc 1, which is provided with a process fluid inlet, are tubes with nozzles 8 which are aimed at faces of the inserts. The milling cutter is also provided with balancing attachments 9 which comprise bushings with adjustable weights. The balancing attachments 9 compensate for the non-uniform distribution of the tool weight and their design is outside the scope of this invention.

The invention claimed is:

1. A milling cutter comprising:
    (a) a carrier disc adapted for clamping onto a spindle of a machine tool;
    (b) a plurality of insert holders;
    (c) a plurality of braces that connect the insert holders;
    (d) a plurality of arms disposed between the insert holders and the carrier disc;
    (e) a collar that does not project beyond an envelope of inserts, wherein the insert holders are arranged around the collar; and
    (f) a plurality of stiffeners disposed between the insert holders and the collar, further comprising struts disposed between the arms and the braces and struts disposed between the arms and the insert holders.

2. The milling cutter according to claim 1, further comprising nozzles protruding from the carrier disc.

\* \* \* \* \*